United States Patent Office 3,099,663
Patented July 30, 1963

3,099,663
5-NITRO-FURFURAL AZINES
James D. Johnston, New London, Conn., assignor to Chas. Pfizer & Co., Inc., Brooklyn, N.Y., a corporation of Delaware
No Drawing. Filed Apr. 1, 1959, Ser. No. 803,376
6 Claims. (Cl. 260—347.5)

This invention is concerned with antimicrobial agents and more particularly with a series of novel azine compounds which exhibits valuable activity against a variety of microorganisms.

I have made the discovery that compounds having the general formula

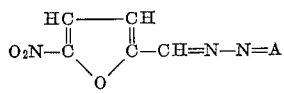

are remarkably effective antimicrobial agents showing activity against a variety of microorganisms, among them organisms which cause disease in animals, including man, and fungi of industrial significance.

A may advantageously be selected from keto-substituted alkanoic and alkanedioic acids, less the keto oxygen, or from formyl-substituted alkanoic acids, less the carboxaldehyde oxygen. Such substituents will preferably contain a total of up to 12 carbon atoms and will include, for example,

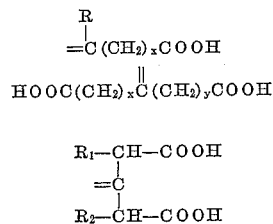

where $R_1$ is hydrogen or alkyl, $R_2$ is alkyl, and $x$ and $y$ are zero or integers. In addition, the salts, such as the alkali-metal and amine salts, and esters, wherein the esterifying group is alkyl containing up to about 18 carbon atoms, may be employed in place of the corresponding acids.

The novel compounds of this invention exhibit in vitro activity against a wide variety of microorganisms, including gram positive and gram negative bacteria. Effectiveness is found, for example, against such organisms as *Micrococcus pyogenes* var. *aureus*, including antibiotic-resistant strains, *Streptococcus pyogenes*, *Erysipelothrix rhusiopathiae*, *Corynebacterium diphtheriae*, *Bacillus subtilis*, *Clostridium perfringens*, *Escherichia coli*, *Vibrio comma*, *Pasteurella multocida*, *Mycobacterium 607*, and *Mycobacterium berolinense*. Effectiveness also is exhibited against a variety of other microorganisms, for example, protozoa such as *Endomeba histolytica* and *Trichomonas vaginalis*, and fungi such as *Alternaria solani*, *Cladosporium cladosporoides*, *Trichophyton rubrum*, *Pythium debarynum*, *Aspergillus niger*, and *Penicillium funiculosum*.

The compounds of this invention also exhibit activity against various species of Salmonella. Among these, a number of compounds are particularly effective in the treatment of Salmonella infections in poultry. Each year a significant number of mortalities occur among poultry flocks, especially chickens, as a result of these infections, with a large economic loss resulting. The most important diseases of this nature in poultry result from infections by *Salmonella gallinarum*, which causes fowl typhoid, and *S. pullorum*, which produces white diarrhea in chicks.

Compounds are evaluated for activity against these organisms in the following manner. An experimentally significant number of day-old chicks are artificially infected with the organism by the oral route. One group serves as a control and receives no treatment. This group is fed a nutritionally adequate diet containing sufficient protein, carbohydrate, fat, vitamins and minerals to promote growth in healthy chicks. The other group receives this same basic diet except that the compound under test is admixed with the feed in sufficient quantity to provide a level of 0.1% by weight of active ingredient. The survival time of all chicks is recorded and from this data is calculated the $ST_{50}$, that is the 50% survival time in days at the 95% confidence limit. The experiment is continued for seven days, at which time the surviving birds are sacrified and the heart, spleen and liver recovered for quantitive determination of viable Salmonella organisms.

Compounds which are found to be particularly effective in this test include, for example, 1-(5-nitro-2-furfural) - 2 - (dimethyl - β - keto - glutarate)azine, 1 - (5-nitro - 2 - furfural) - 2 - (ethyl 3 - ketobutyrate) azine, 1 - ethyl pyruvate - 2 - (5 - nitro - 2 - furfural) azine, and 1 - (5 - nitro - 2 - furfural) - 2 - (dimethyl 3 - keto-2 - methyl - glutarate) azine. Especially valuable are 1 - (5 - nitro - 2 - furfural) - 2 - (diethyl β - ketoglutarate) azine, and 1 - (5 - nitro - 2 - furfural) - 2 - (dimethyl 2,4-dimethyl-3-ketoglutarate) azine.

These new compounds are conveniently prepared by the condensation of 5-nitrofurfural hydrazone with a carbonyl compound, in a solvent such as ethanol or acetonitrile at refluxing temperature, according to the following general reaction

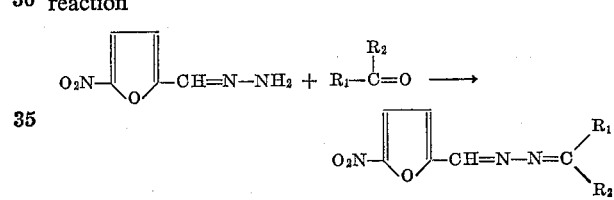

where $R_1$ and $R_2$ are selected to conform to the structures hereinabove described. Alternatively, they may be prepared by condensing the hydrazone derived from the carbonyl compound with 5-nitrofurfural, or its diacetate. The carbonyl compounds are in general readily available or may be synthesized by methods well known to those skilled in the art.

For anti-infective application, these new compounds may be blended with excipients or dispersed in diluents including water, isotonic saline, oils such as sesame oil, and the like. Many modes of administration are possible, including oral, subcutaneous, intramuscular, intravaneous and topical application, the choice being dictated by the type and severity of the infection. For administration to poultry in the treatment of Salmonella infections, the compounds will ordinarily be administered orally, and may be admixed with feed to provide a concentration of at least about 0.001%, and preferably 0.01% or more by weight of active ingredient.

The following examples are given solely for the purpose of illustration and are not to be construed as limitations of this invention, many variations of which are possible without departing from the spirit or scope thereof.

EXAMPLE I

A mixture of 0.1 mole 5-nitrofurfural hydrazone and 0.1 mole of dimethyl-2,4-dimethyl-3-keto-glutarate in 500 ml. acetonitrile is heated at refluxing temperatures for about four hours. The resulting solution is filtered and the filtrate treated with activated carbon and evaporated in vacuum. The clear gum is treated with 250 ml. methanol and refrigerated. Filtration of the resulting crystalline slurry and recrystallization from methanol yields 1-(5-nitro-2-furfural)-2-(dimethyl-2,4-dimethyl - 3 - ketoglutarate) azine in the form of a crystalline solid melting at about 155° C.

EXAMPLE II

Following the procedure of Example I, diethyl acetonedicarboxylate is caused to react with 5-nitrofurfural hydrazone, yielding 14.6 g. of 1-(5-nitro-2-furfural)-2-(diethyl-$\beta$-ketoglutarate) azine in the form of orange plates melting at about 126° C. and having the following elemental analysis: carbon, 49.42%; hydrogen, 5.04%; nitrogen, 12.4%. Ultraviolet absorption maxima are observed at 3100 A. ($\epsilon$=15,100) and 4060 A. ($\epsilon$=29,250 in methaol). An infrared absorption maximum is observed at 5.755 microns.

EXAMPLE III

Following the procedure of Example I, the following series of compounds is prepared:

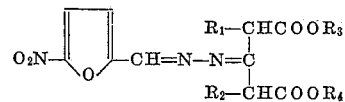

| $R_1$ | $R_2$ | $R_3$ | $R_4$ |
|---|---|---|---|
| $CH_3$ | H | $CH_3$ | $CH_3$ |
| H | H | $CH_3$ | $CH_3$ |
| H | H | $C_3H_7$ | $C_3H_7$ |
| H | H | $C_5H_{11}$ | $C_5H_{11}$ |
| H | H | $C_6H_{13}$ | $C_6H_{13}$ |
| H | H | $C_8H_{17}$ | $C_8H_{17}$ |
| H | H | $C_{12}H_{25}$ | $C_{12}H_{25}$ |
| H | H | $C_{18}H_{37}$ | $C_{18}H_{37}$ |
| H | H | H | H |
| $C_3H_7$ | $C_3H_7$ | $CH_3$ | $CH_3$ |
| $CH_3$ | $CH_3$ | $C_2H_5$ | H |
| $CH_3$ | $C_2H_5$ | Na | Na |
| $CH_3$ | $CH_3$ | $NH_3(C_2H_5)$ | $NH_3(C_2H_5)$ |

EXAMPLE IV

The product of Example I is subjected to standard in vitro plate tests against a variety of microorganisms. The medium employed is prepared by adding 37 grams of dehydrated Bacto brain-heart infusion B37 (purchased from Difco Laboratories of Detroit) to a liter of distilled water and sterilizing the resulting solution in an autoclave. The compound under test is added to the brain-heart broth in various concentrations, up to 200 mcg. per ml., and the solutions are applied to agar plates seeded with one of the organisms. In this manner the minimum concentration of active ingredient necessary to inhibit organism growth for 24 hours at 37° C. is determined. Results are as follows:

*Minimum Inhibitory Concentration*

| | Mcg./ml. |
|---|---|
| Bacillus subtilis | 25 |
| Clostridium perfringens | 25 |
| Bacterium ammoniagenes | 200 |
| Aerobacter aerogenes | 200 |
| Proteus vulgaris | 100 |
| Pseudomonas aeruginosa | 100 |
| Erwinia amylovora | 100 |
| Desulfovibrio desulfuricans | 200 |
| Vibrio comma | 100 |

When 5-nitrofurfural hydrazone is subjected to the same series of tests, it does not inhibit organism growth.

EXAMPLE V

The products of Examples II and III are subjected to similar screening tests and are found to be active against a wide variety of Gram-positive and Gram-negative organisms.

EXAMPLE VI

The product of Example I is screened against Salmonella according to the same procedures, with the following results:

*Minimum Inhibitory Concentration*

| | Mcg./ml. |
|---|---|
| S. typhosa | 100 |
| S. pullorum | 25 |
| S. gallinarum | 50 |

EXAMPLE VII

A typical poultry feed is prepared having the following composition:

| | Percent |
|---|---|
| Ground yellow corn | 51.28 |
| Soybean oil meal (51%) | 38.15 |
| Corn oil | 6.10 |
| Calcium carbonate | 1.20 |
| Dicalcium phosphate | 1.35 |
| Salt | 0.61 |
| Delmix (commercially available mineral mix containing $CaCO_3$ and small amounts of iron, zinc, manganese and other salts—Limestone Products Corporation of America, New Jersey). | |
| Vitamin A (5305 IU/lb.) | 0.1 |
| Vitamin $D_3$ (681 ICU/lb.) | 0.05 |
| Klotogen F (commercially available form of vitamin K—Abbott Laboratories) | 0.0003 |
| Pyridoxine hydrochloride | 0.0006 |
| D,L-methionine | 0.140 |
| Niacin USP | 0.0025 |
| Choline chloride (25%) | 0.2 |
| Riboflavin | 0.06 |
| Calcium pantothenate (45%) | 0.002 |
| Myvamix (commercially available form of vitamin E) | 0.05 |

The products of Examples I and II are added to different samples of this feed to provide compositions containing 0.1% by weight of active ingredient. These compositions are successfully employed in the treatment of chicks infected with S. gallinarum, no toxic effects of the azine being observed. At the conclusion of the experiment the birds are sacrificed and the heart, spleen and liver found to be free of viable Salmonella.

When 5-nitrofurfural hydrazone is employed in the same test, it is found to be toxic, causing weight loss and early death. At levels below 0.1%, it is inactive.

EXAMPLE VIII

1 - (5 - nitro - 2-furfural)-2-(dimethyl-$\beta$-keto-glutarate) azine is tested in vivo against *S. gallinarum* and *S. pullorum* according to the procedure described in Example VIII at levels of 0.1, 0.05 and 0.01%. Significant activity against both infections is noted at all levels with no toxic effects.

What is claimed is:

1. 1-(5-nitro-2-furfural)-2-(ethyl 3-ketobutyrate) azine of the formula

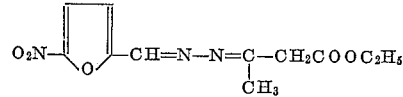

2. 1-(5-nitro-2-furfural)-2-(dimethyl - $\beta$ - keto - glutarate) azine of the formula

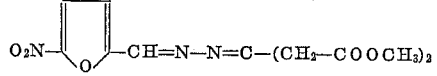

3. 1-(5-nitro-2-furfural) - 2 - (diethyl $\beta$-ketoglutarate) azine of the formula

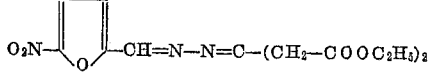

4. 1-(5-nitro-2-furfural) - 2 - dimethyl 2,4 dimethyl-3-ketoglutarate) azine of the formula

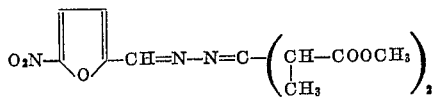

5. 1-(5-nitro-2-furfural)-2-(dimethyl 3 - keto-2-methyl-glutarate) azine of the formula

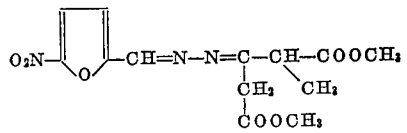

6. A compound of the formula

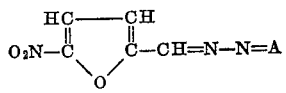

wherein A is a substituted methylidene moiety derived from a carbonyl compound selected from the group consisting of keto-alkanoic acid, keto-alkanedioic acid and formylalkanoic acid, each acid containing up to 12 carbon atoms, alkali-metal salts of said acids and esters of said acids wherein the esterifying group is alkyl containing up to 18 carbon atoms.

References Cited in the file of this patent

FOREIGN PATENTS

| 3,225 | Japan | May 14, 1955 |
| 180,357 | Japan | Sept. 12, 1949 |

OTHER REFERENCES

Dann et al.: Chemische Berichte, volume 82, pages 84 to 88 (1949).
Dreizen et al.: Journal of Dental Research, volume 28, pages 288 to 298 (1949).
Chemical Abstracts, volume 45, page 10302 (1951).
Dodd et al.: J. Am. Pharm. Assoc., volume 39, pages 313-315 (1950).
Chemical Abstracts, volume 47, page 6885 (1953).
Dunlop et al.: "The Furans" (ACS Monograph No. 119), pages 164 to 165 and 362 to 363, Reinhold Publishing Corp. (1953).
Derwent French Patents Abstracts, volume 1, No. 11, Group 3, page 1 (Sept. 29, 1961).